Patented Apr. 7, 1936

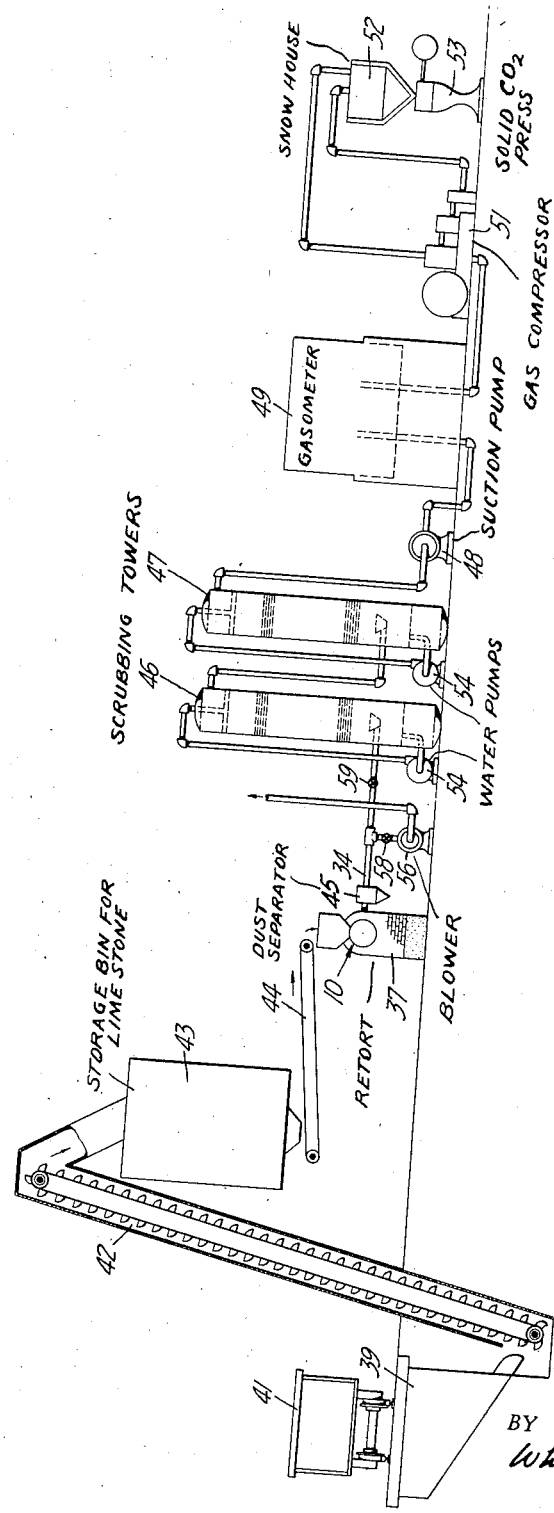

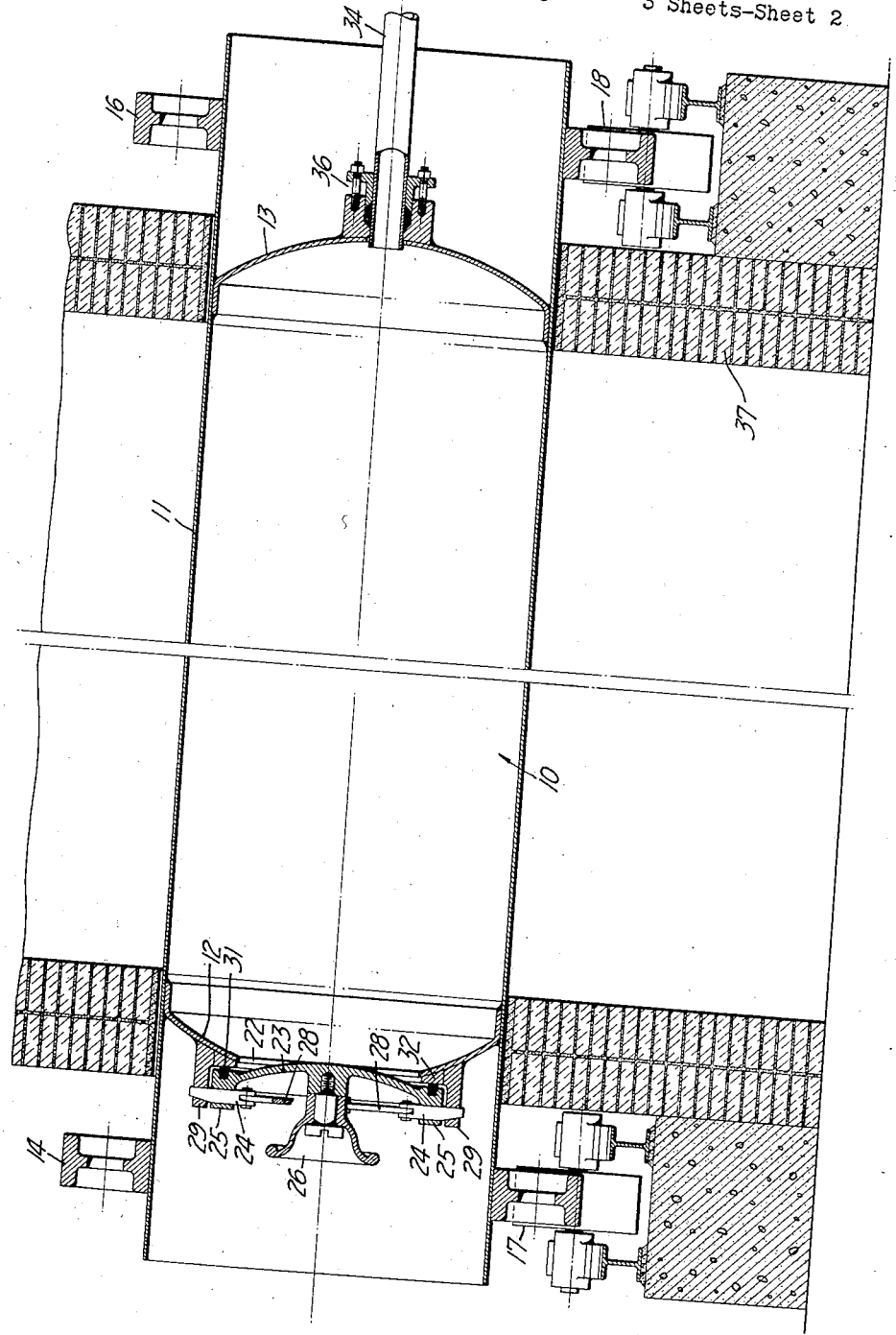

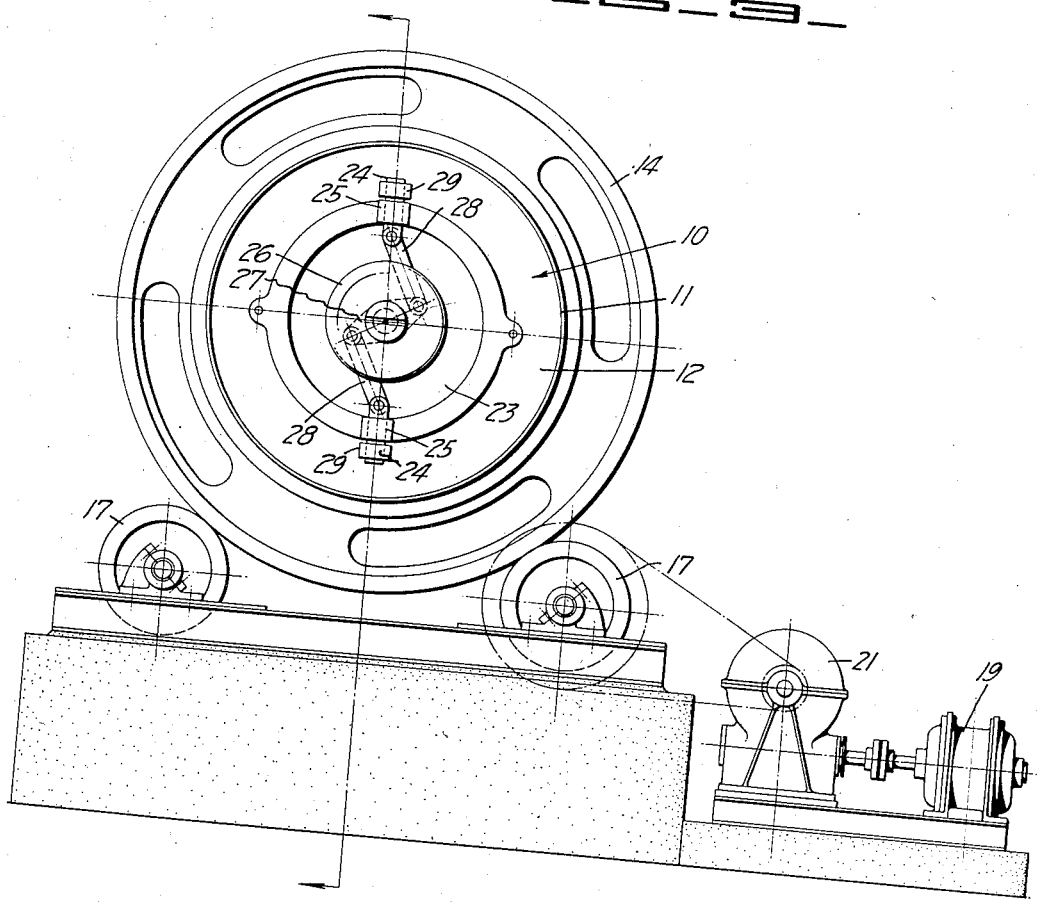

2,036,517

UNITED STATES PATENT OFFICE 2,036,517

PROCESS FOR MANUFACTURE OF CARBON DIOXIDE FROM LIMESTONE

Murray N. Colman, Los Altos, Calif.

Application February 11, 1933, Serial No. 656,317

1 Claim. (Cl. 23—150)

This invention relates generally to methods and apparatus for the heat treatment of certain natural ores, to effect conversion or decomposition of the same. It has particular application to the treatment of limestone or like material containing carbonates, to enable manufacture of a relatively pure form of carbon dioxide gas, together with oxides of relatively high quality and availability.

In many industrial processes it is desirable to provide a source of carbon dioxide gas, in relatively pure condition, and at low cost. This is particularly true of the so-called "dry ice" industry, where the cost of the solidified carbon dioxide product is dependent to a substantial degree upon the cost of the carbon dioxide utilized. In the past the dry ice industry has been largely dependent upon the use of by-product gases from other industries, from which the carbon dioxide must be separated and purified, at considerable expense. Although it has been known that carbon dioxide can be produced by the conversion of limestone, attempts to utilize this material as a cheap source of such gas have failed commercially, due largely to the fact that the processes and apparatus utilized necessitated relatively high retort temperatures, thus causing the apparatus to deteriorate rapidly, and because the conversion of the limestone could not be carried out quickly and relatively efficiently.

It is an object of the present invention to provide a commercial process and apparatus which will enable conversion of limestone to produce carbon dioxide at low cost, which will not involve rapid deterioration of the retorts and other equipment utilized, and which will result in relatively rapid and efficient conversion.

A further object of the invention is to provide a process of the above character which will result in production of a calcium oxide of relatively high quality and availability and which will be valuable of itself as a new article of manufacture.

A further object of the invention is to provide a method and apparatus of the above character which will at all times be under proper control to attain the desired results.

Further objects of the invention will appear from the following description in which the preferred embodiment of the invention has been set forth in detail in conjunction with the accompanying drawings. The appended claim is to be accorded a range of equivalents consistent with the state of the prior art.

Figure 1 is a diagrammatic view, illustrating apparatus incorporating the present invention, for the production and purification of carbon dioxide gas from limestone.

Figure 2 is a side elevational view, in cross-section illustrating a retort such as is preferably utilized in my invention.

Figure 3 is an end view of the retort illustrated in Figure 2, looking from left to right.

The method or process of the invention can best be understood after an explanation of the apparatus illustrated in the drawings. Thus, referring to Figs. 2 and 3, there is shown a retort 10, formed of a cylindrical shell 11 provided with end heads 12 and 13. In order to support this retort so that it can be rotated about a horizontal axis, its end portions are shown provided with track rings 14 and 16, which serve to engage rollers 17 and 18. These rollers are shown supported by suitable journals, and at least one of them is driven by suitable means, such as an electric motor 19 and a gear box 21.

Head 12 is provided with an opening 22 to permit access to the interior of the retort, and this opening is normally sealed by a removable closure 23. While various types of clamping means may be utilized for retaining the closure 23 upon the head 12, and to afford a sealed fit, I have shown suitable clamping means including a pair of slidable lock bars 24, slidably retained by lugs 25. Journaled centrally upon closure 23 there is a hand wheel 26 which serves to rotate the lever arms 27. Lever arms 27 are connected to lock bars 24 by links 28, and these bars are adapted to engage with aperture lugs 29 secured to the head 12. A gasket 31, formed upon the inner face of closure 23, forms a sealed engagement with the annular seat 32 on the head 12.

Communicating thru the head 13 there is a central pipe or conduit 34, which is sealed with respect to the retort by the packing gland 36.

In order to heat the charges placed within the retort to an elevated temperature, the medial portion of the retort is shown disposed within the combustion chamber of a suitable furnace 37, immediately above the furnace fire box. This furnace may burn any suitable fuel, such as oil or gas, and the products of combustion are arranged to flow upwardly and about the retort, so that heat is transmitted to the walls of shell 11 to the interior charge.

In order to afford a long, useful life, the retort, and particularly the shell 11 and heads 12 and 13 thereof, are formed of a suitable metal or metal alloy capable of withstanding high temperatures, such as ni-chrome, monel metal, or certain so-called stainless steels.

Referring now to Fig. 1, I have shown a diagrammatic arrangement of apparatus for the manufacture of dry ice, utilizing the retort of Figs. 2 and 3 for the production of carbon dioxide. Thus for supplying crushed limestone to the retort 10 of the furnace 37, I have shown a receiving bin 39, into which the limestone is delivered from cars 41 on a spur track. Elevator 42 serves to deliver the limestone from bin 39 to a storage bin 43. From bin 43 charges of the limestone can be delivered by the conveyor 44 to the retort 10.

Conduit 34, leading from the retort 10, communicates with the scrubbing towers 46 and 47, which may be serially connected and which serve to remove impurities from the evolved gas. A dust separator 45 may be interposed in this line to remove entrained lime dust. Vacuum pump 48 connected to the upper portion of tower 47, has its discharge connected with a gasometer 49. From this gasometer, purified carbon dioxide can be supplied to a compressor 51 which, together with a snow-house 52 and ice press 53, serves to convert the carbon dioxide into solid form. Pumps 54 serve to circulate scrubbing water thru the towers 46 and 47. A branch pipe leading from conduit 34 communicates with the inlet side of a blower 56, the discharge side of which may lead to the atmosphere. By means of valves 58 and 59, all of the gaseous products removed from the retort can be diverted thru blower 56, or thru the scrubbing towers 46 and 47 to the exclusion of blower 56. Blower 56 is preferably of the positive displacement type, as for example a "Roots" blower.

If operating conditions tend to cause the water in towers 46 and 47 to be unduly heated, suitable cooling means for the water may be provided, or means may be provided for the cooling of carbon dioxide before its introduction into the towers.

Operation of my apparatus, and the carrying out of my method or process are as follows:— Closure 23 of the retort is removed, and the interior of the retort partially filled with crushed limestone. At this time the retort may be stationary, and the fire in the furnace should be reduced. The retort is then sealed, and started in continuous rotation, while the fire in the furnace is increased. By closing valve 59 and opening valve 58, water vapor, air, and other gases evolved from the limestone during this preliminary heating, are discharged to the atmosphere. Blower 56 at this time may draw a vacuum of about ten inches of mercury. The heating, on an increasing temperature gradient, is continued until the temperature of the limestone has risen to in the neighborhood of 50 degrees centigrade. The temperature at this time should not be sufficiently high to cause substantial conversion of the limestone to evolve carbon dioxide, under the vacuum maintained by the blower 56. Assuming that in the meantime vacuum pump 48 has been put into operation, or has been maintained in operation, to produce a relatively low pressure in scrubbing towers 46 and 47, such as about 50 mm. of mercury (absolute) or less, the operator now closes valve 58, and opens valve 59, to connect the retort to the scrubbing towers. The effect of this operation is to substantially reduce the pressure within the retort below that critical value at which conversion takes place to liberate carbon dioxide, at the temperature to which the limestone is heated. Conversion of the limestone now commences with explosive suddenness, and the liberated carbon dioxide is delivered to the scrubbing towers 46 and 47, where it is purified and subsequently delivered to the gasometer 49. After practically all of the carbon dioxide has been liberated and removed, valves 58 and 59 are closed, the fire in the furnace reduced, and closure 23 is removed to permit discharge of the converted limestone.

Certain characteristics of my invention should be noted in particular. In the first place, because the conversion of the limestone takes place under vacuum, it is unnecessary to heat the retort and the limestone to such a temperature as has been used in the past, for the conversion of limestone at atmospheric pressures. For the conversion of limestone at atmospheric pressures, temperatures in excess of 900 degrees centigrade must be employed, which will rapidly deteriorate any retort. The use of substantially lower temperatures under conditions of vacuua, makes it possible for my retort to have a long, useful life, particularly when made of metals which will withstand relatively high temperatures, such as stainless steels. A further characteristic is that the limestone is utilized in crushed condition and is being continuously agitated during the treatment. In stationary retorts such as have been employed in the past, it has been impossible to employ relatively finely crushed limestone, and therefore there has been lack of efficiency in heat conduction, and decomposition. I have found that when finely crushed limestone is being continuously agitated, heat is not only efficiently transferred throughout the entire mass, but the conversion or decomposition takes place more rapidly and more efficiently.

In addition to the above characteristics, it will be noted that at a certain point in the process, the pressure within the retort is materially reduced to carry the process over the critical temperature-pressure requirements for commencing the decomposition of the limestone. Aside from other advantages this makes it possible to predetermine at the beginning of the decomposition cycle, so that the carbon dioxide can be removed most effectively and efficiently.

In connection with the efficiency with which limestone is converted in accordance with my process, I have also found that the use of a reduced pressure, to effect conversion and lower temperatures than that which would be required if conversion were effected under atmospheric pressure, the time required for removal of substantially all of the carbon dioxide is greatly reduced. This is because at the reduced pressure, the gas is evolved at an exceedingly rapid rate. In some instances I have found that under the temperatures which I utilize for decomposition and under reduced pressures of the character specified, the rate of evolution of gas may be many times as great as the rate for limestone heated to a higher temperature to effect conversion under atmospheric pressure.

With respect to maintenance of the reduced pressure in the retort during conversion of the limestone, the vacuum pump 48 should preferably be of sufficient capacity to maintain the pressure within the retort substantially below atmospheric, during the entire conversion cycle, so that after decomposition is commenced, it continues to completion. However in the event the carbon dioxide gas is evolved at such a high rate, that the vacuum pump 48 is unable to maintain a vacuum of the degree desired for most efficient continued conversion, a temporary reduction in the vacuum within the retort may occur, and this will be accompanied by a lesser rate of conversion, to permit the vacuum pump 48 to again increase the vacuum. Thus in normal operation during the conversion cycle the vacuum will vary somewhat, but an automatic balance will be maintained between the rate of conversion and the vacuum.

In addition to the fact that my apparatus and method makes possible commercial manufacture of relatively pure carbon dioxide for the manufacture of dry ice, the converted limestone, resulting from my process, is a valuable product in itself. The calcium oxide content of the limestone has relatively high availability. In the past it has been attempted to increase the availability of calcium oxide resulting from the decomposition of limestone, by increasing the retort temperatures. Aside from the fact that such expedients are expensive and serve to rapidly deteriorate the apparatus utilized, parts of the limestone are frequently burned or overheated. In my process overheating of portions of the limestone cannot occur, and the entire mass of limestone is converted uniformly. Likewise the sudness with which the decomposition commences, tends to produce a product which is less dense in its physical form.

While the invention has been described particularly with respect to limestone to produce carbon dioxide, and calcium oxide, it may also apply to other materials containing carbonates or bicarbonates, capable of being decomposed by heat, to produce carbon dioxide and various oxides.

I claim:

In a process of manufacturing carbon dioxide from limestone or like material, heating the limestone on an increasing temperature gradient in a sealed retort to an elevated temperature, said temperature being substantially less than that required to cause carbon dioxide to be evolved from the limestone when the limestone is heated under atmospheric pressure, removing evolved water vapor and gases from the retort during the initial part of such heating period, then reducing the pressure within the retort to effect evolution of carbon dioxide, and removing the evolved carbon dioxide while the decomposition of the limestone proceeds, the contents of the retort being continuously agitated throughout the process.

MURRAY N. COLMAN.